Sept. 7, 1926. 1,598,765
J. H. FOX ET AL
PROCESS AND APPARATUS FOR DRAWING SHEET GLASS
Filed Jan. 13, 1926  4 Sheets-Sheet 3
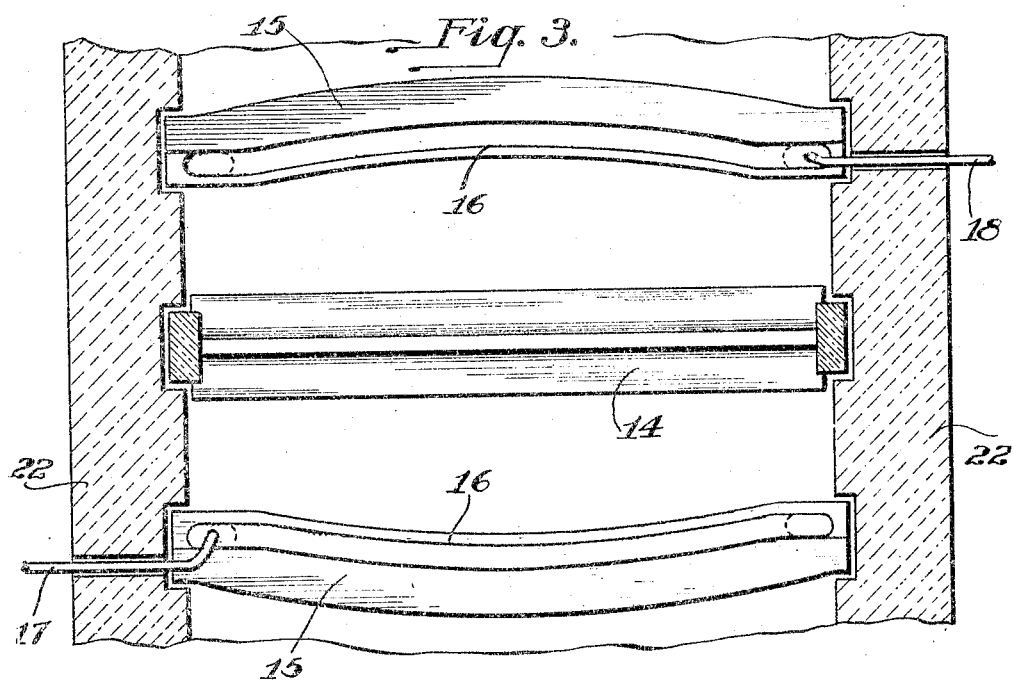
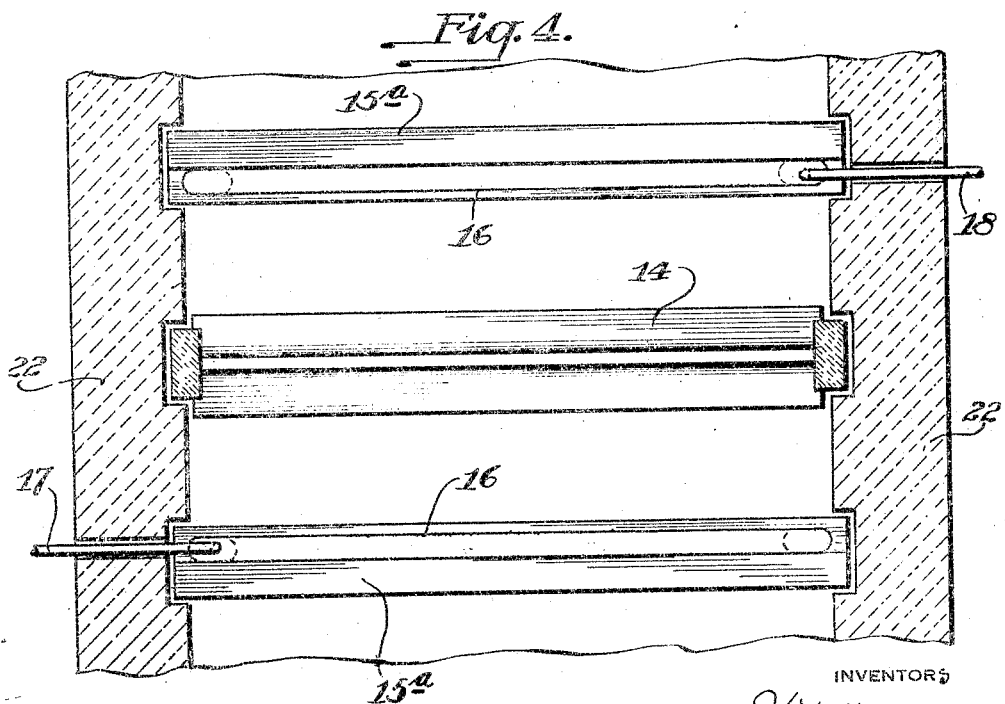
INVENTORS

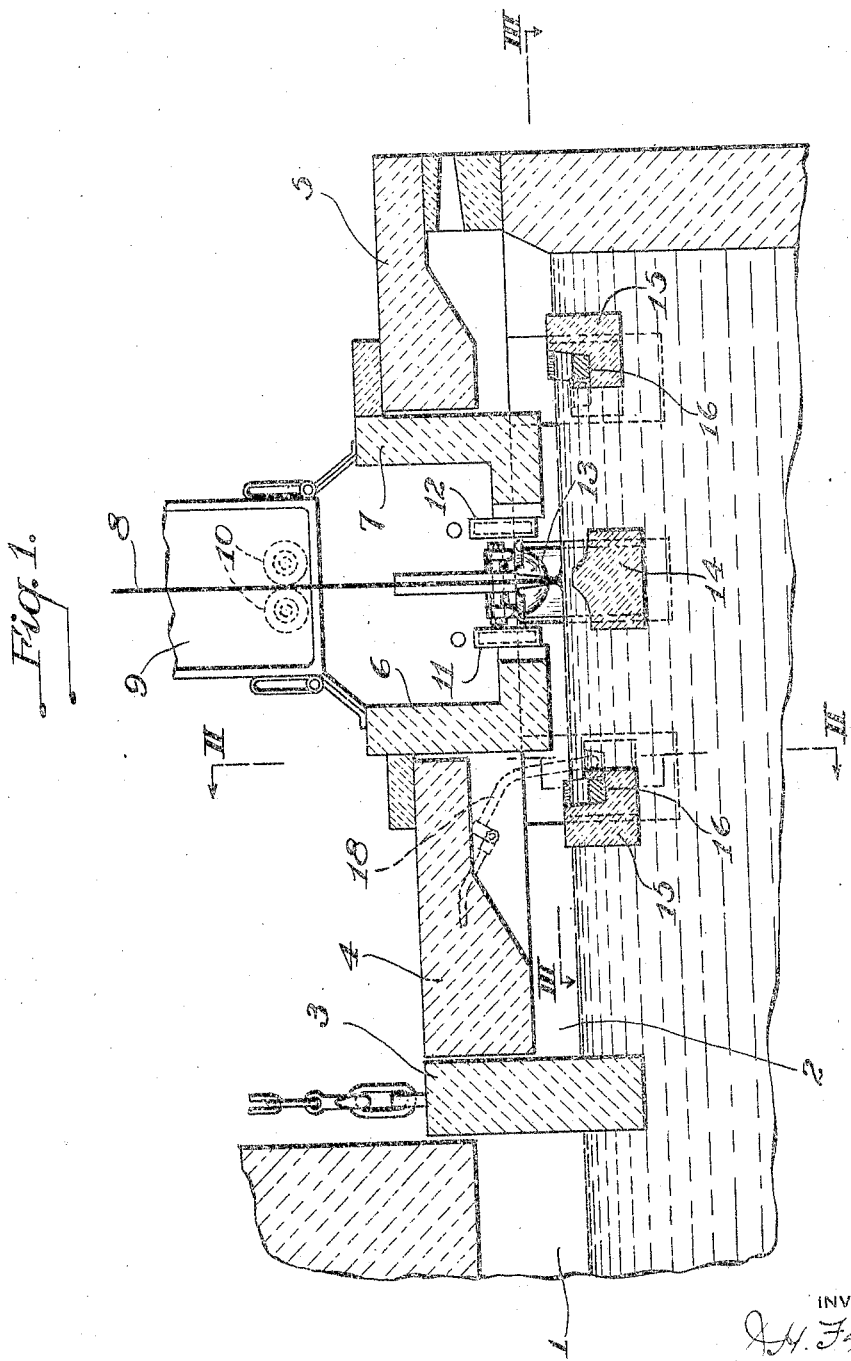

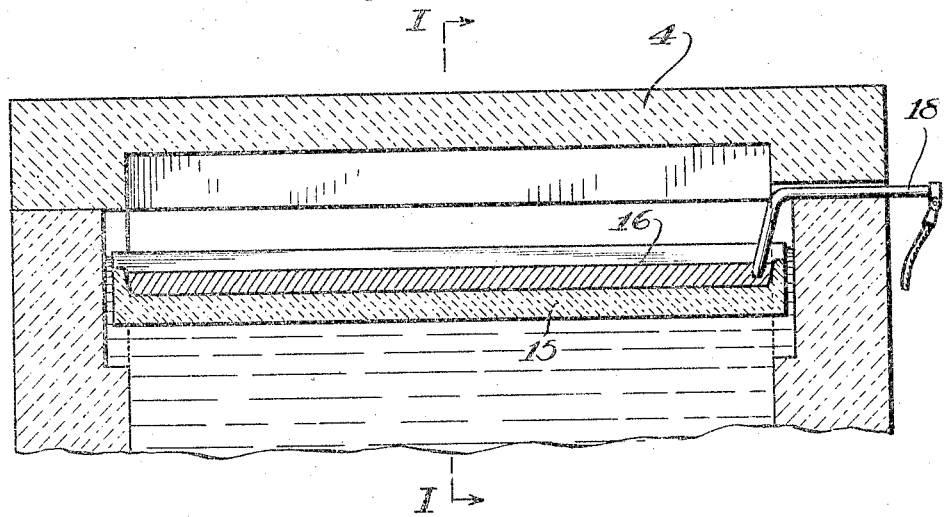
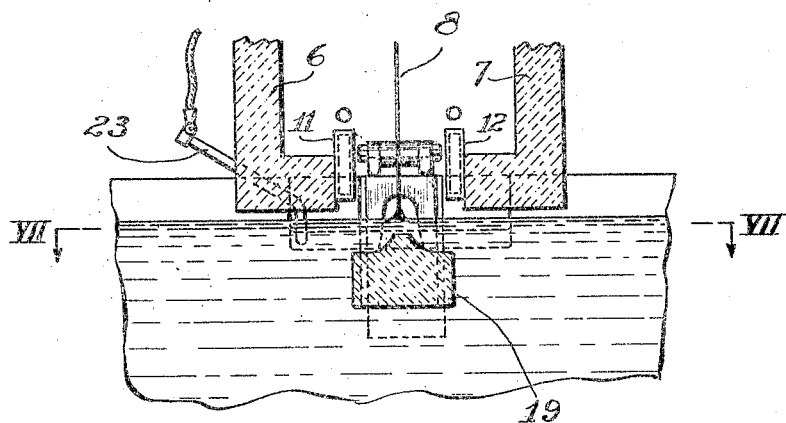

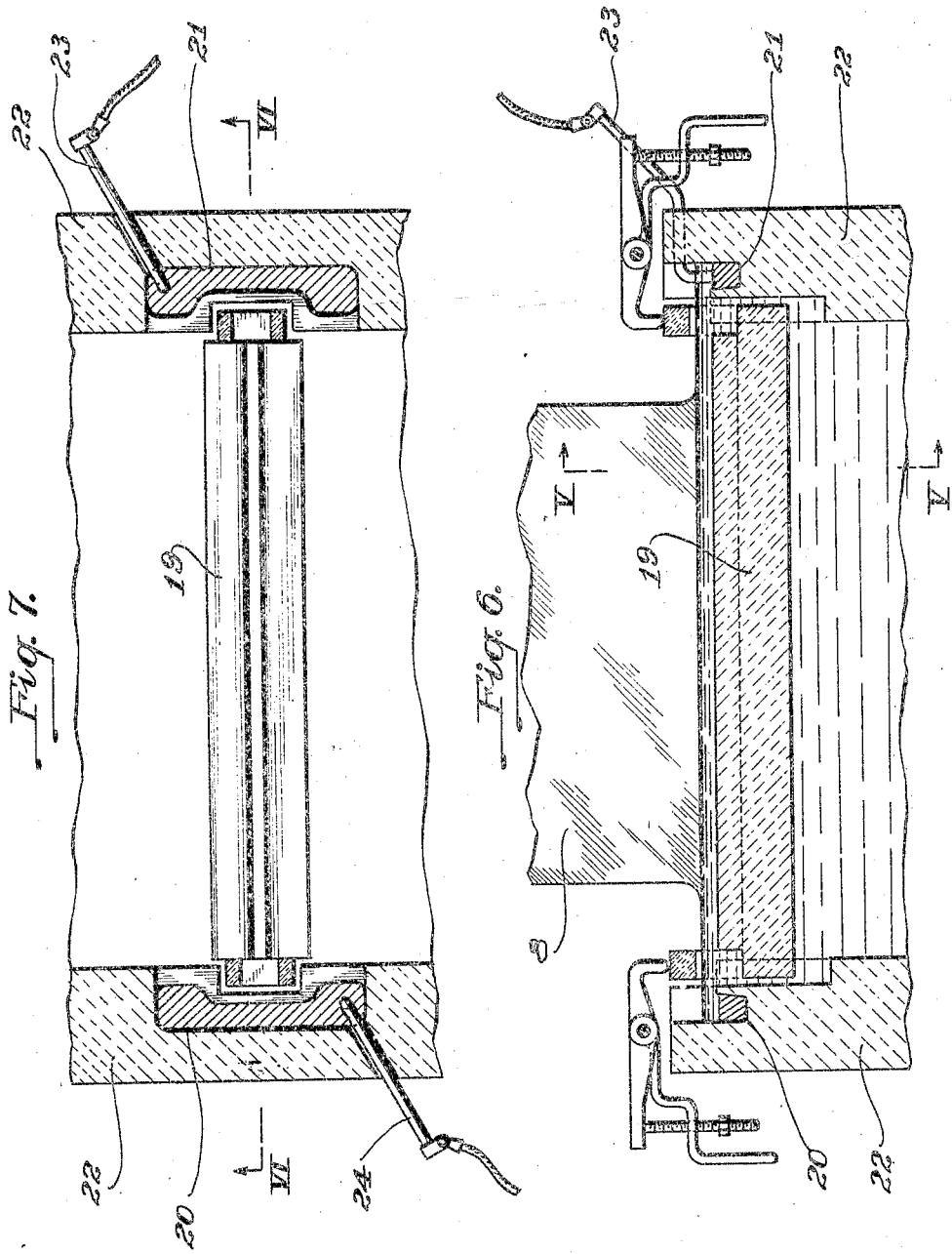

Patented Sept. 7, 1926.

1,598,765

UNITED STATES PATENT OFFICE.

JOHN H. FOX AND HARRY F. HITNER, OF PITTSBURGH, PENNSYLVANIA, ASSIGNORS TO PITTSBURGH PLATE GLASS COMPANY, A CORPORATION OF PENNSYLVANIA.

PROCESS AND APPARATUS FOR DRAWING SHEET GLASS.

Application filed January 13, 1926. Serial No. 80,939.

The invention relates to a process and apparatus for drawing sheet glass, and particularly to the heating or reconditioning of the portion of the bath from which the draw occurs. A draw-bar of clay is often employed in the bath underneath the line of generation of a glass sheet and in the course of time, a certain amount of devitrification occurs upon the upper side of the bar, so that the operation must be stopped from time to time, the drawing opening covered over and the surface glass subject to a reheating operation for one or more hours before the draw is continued. The purpose of the invention is to reduce this loss of time by the use of an electrical heating arrangement, which can be put into operation from time to time and which will secure a reheating and reconditioning of the glass in a relatively short period of time. The invention is also of use even where no draw-bar is employed in the bath, as even without a draw-bar, it becomes desirable to reheat the surface glass in the bath from time to time. The process is further not limited to an intermittent operation, as the electric heating means may be employed, either when a draw-bar is used or when it is not used, to keep the surface glass from which the sheet is generated at a uniform temperature during the drawing operation. The temperature condition may be adjusted by this means to any desired degree by merely regulating the flow of electric current. Certain embodiments of the invention are illustrated in the accompanying drawings, wherein:

Figure 1 is a vertical section on the line I—I of Fig. 2. Fig. 2 is a section on the line II—II of Fig. 1. Fig 3 is a partial horizontal section on the line III—III of Fig. 1. Fig. 4 is a section similar to that of Fig. 3, but showing a modified form of floater. And Figs. 5, 6 and 7 are views similar to those of Figs. 1, 2 and 3, but showing a further modification.

Referring to Fig. 1, the numeral 1 designates the end of a glass melting tank having an extension or forehearth 2 partially cut off from the tank by means of the gate 3 and provided with a cover or top in the form of the plates 4 and 5 and the L-blocks 6 and 7, between which is the drawing opening. The glass sheet 8 is drawn upward from the bath continuously through the vertical leer 9 which is provided with a plurality of sets of rollers 10 engaging the opposite sides of the glass, the lower pair of rollers only being shown.

A pair of water coolers 11 and 12 are preferably employed above the surface of the glass between the L-blocks and the sheet is held against moving inward at its edges as the drawing progresses by means of a pair of holding devices 13, 13, such as those illustrated and described in the Slingluff Patent No. 1,549,513; of Aug. 11, 1925. The means for pulling the sheet upward from the bath, cooling it after it leaves the bath, and holding its edges against inward movement constitute no part of the present invention which relates entirely to the process and apparatus for conditioning the glass in the bath and maintaining it at a proper temperature as hereinafter described.

Extending longitudinally of the line of generation of the sheet 8, and spaced beneath the surface of the glass, is a draw-bar 14 of refractory material, such as clay, such draw-bar assisting in cooling the layer of glass thereabove from which the sheet is drawn and serving to maintain the line of generation of the sheet constant during the drawing operation. On each side of the draw-bar is a floater 15, also of refractory material, such as clay, which floaters act as skimming devices and prevent surface impurities from being carried along and drawn into the sheet. Each of these bars is provided along its front side below the surface of the glass with a trough or groove 16, and these troughs are filled with molten metal, such as antimony, suitable for forming an electrode and of a character such that the glass will not react therewith and produce discoloration. These troughs of metal are supplied with a flow of electric current through the terminals 17 and 18, having their ends extended down into the molten metal. These terminals should be of a composition suitable for resisting high temperatures and not readily acted upon by the molten glass. Two of such compositions are the well-known "nichrome" and "askaloy." Electric current is supplied from a suitable generator. The floaters 15, 15 are preferably bowed away from each other, as indicated in Fig. 3 for a purpose as hereinafter set forth, although such floaters may be parallel, as indicated in Fig. 4.

If, during the course of the draw, devitrified glass is formed above the draw-bar 14, the glass may be reheated and reconditioned by passing a powerful flow of electric current between the electrodes 16, 16, the current thus supplied passing through the surface layer of glass lying above the bar 14, as indicated by the arrows in Fig. 1. In this manner, the glass lying above the bar may be refined and reconditioned so that the defects in the sheet which arise from devitrification are removed. Ordinarily, the drawing of the sheet 8 will be discontinued during this remelting operation, although this is not necessarily the case. This reheating may be accomplished without removing the water coolers 11 and 12 or the edge holding members 13, although it is desirable to remove the latter in case the draw is discontinued during the remelting operation. It is not necessary to cover over the drawing opening between the L-blocks during the reheating operation, so that there is no requirement for removing the water coolers 11 and 12 and the reheating operation may be carried out much more rapidly and with less inconvenience than occurs with the present method of reconditioning the glass which calls for the removal of the water coolers and the placing of a cover plate over the drawing opening between the L-blocks.

The invention may be also employed for regulating the temperature of the glass during the drawing operation and this also applies when no draw-bar is employed. Under these conditions, the flow of current is, of course, much less than that employed if remelting or reheating in order to remove devitrified glass, only enough current being supplied to keep the surface glass at exactly the right temperature for securing the desired results in the drawing of the sheet. Under this condition of continuous operation, it is desirable to have the floaters 15, 15 bowed, as indicated in Fig. 3, in order that the heating effect of the current will be less at the center of the sheet than at the edges, since the temperature of the glass bath in a tank is normally higher adjacent the center than at the edges and a tendency always exists to draw the sheet thinner at the center than at the edges. The bowed skimming bars with their electrodes compensate for this condition, which, however, is not an essential as other expedients may be adopted for regulating the temperature of the bath from which the sheet is drawn, so that the central portion of the bath is given a temperature treatment reducing the temperature of this portion of the bath as compared with that at the edges of the tank.

In the construction, as shown in Fig. 4, the floaters 15ª, 15ª are straight and parallel to each other instead of being bowed, the construction in other respects being the same as that of Figs. 1, 2 and 3 and similar reference numerals being used throughout.

In the construction shown in Figs. 5, 6 and 7, the electrodes 15, 15 of Fig. 1 are dispensed with and the heating current above the draw bar 19 is directed crosswise of the tank between the electrodes 20 and 21 which are of molten metal lying in pockets or troughs in the side walls 22, 22 adjacent the surface of the glass. Current is supplied to the electrodes from the terminals 23 and 24, thus causing a flow of current through the layer of glass above the draw-bar 19 and longitudinally of such bar instead of transversely, as is the case in the Fig. 1 construction. The purpose here is to provide for the remelting from time to time of any devitrified glass which may be formed upon the upper surface of the draw-bar 19. The other parts of the construction are similar to those of the Fig. 1 construction and are similarly designated by reference numbers.

What we claim is:

1. A process of drawing glass, which consists in drawing a sheet upwardly from a molten bath, and passing a flow of electric current through the bath so that the major portion thereof flows through the layer of glass at the surface of the bath from which the sheet is drawn.

2. A process of drawing glass, which consists in drawing a sheet upwardly from a molten bath, and, from time to time, passing a flow of electric current through the layer of glass at the surface of the bath from which the sheet is drawn so as to heat such glass above the normal drawing temperature in order to recondition the glass.

3. A process of drawing glass, which consists in drawing a sheet upwardly from a molten bath, segregating the layer of glass at the surface of the bath from which the sheet is generated, from the main body of glass therebeneath, and heating such layer of glass by passing a current of electricity therethrough.

4. A process of drawing glass, which consists in drawing a sheet upwardly from a molten bath, segregating the layer of glass at the surface of the bath from which the sheet is generated, from the main body of glass therebeneath, and reheating such layer of glass at intervals by passing a current of electricity therethrough.

5. A process of drawing glass, which consists in drawing a sheet upwardly from a molten bath, segregating the layer of glass at the surface of the bath from which the sheet is generated, from the main body of glass therebeneath, and heating such layer of glass by passing a current of electricity therethrough in a direction transverse to the line of generation of the sheet.

6. A process of drawing glass, which consists in drawing a sheet upwardly from a molten bath, and passing a flow of electric current through the bath so that the major portion thereof flows through the layer of glass at the surface of the bath from which the sheet is drawn, the said flow of current being in a direction transverse to the line of generation of the sheet.

7. A process of drawing glass, which consists in drawing a sheet upwardly from a molten bath, and passing a flow of electric current through the bath so that the major portion thereof flows through the layer of glass at the surface of the bath from which the sheet is drawn, the said flow of current being in a direction transverse to the line of generation of the sheet, and in an amount decreasing from the edges of the sheet to the center, so that the glass bath is heated to a less degree at the center of the sheet than at the edges.

8. The combination with a glass tank, and means for drawing a sheet continuously therefrom, of an electrode at each side of the line of generation of the sheet adjacent the surface of the glass, and means for causing a flow of electric current through the layer of glass therebetween from which the sheet is drawn.

9. The combination with a glass tank, and means for drawing a sheet continuously therefrom, of an electrode at each side of the line of generation of the sheet adjacent the surface of the glass, and means for causing a flow of electric current through the layer of glass therebetween from which the sheet is drawn, said electrodes being bowed away from each other at their centers.

10. The combination with a glass tank, and means for drawing a sheet continuously therefrom, of a draw-bar of refractory material extending transversely of the tank and submerged below the surface of the glass, and means for passing a current of electricity through the layer of glass lying above such bar.

11. The combination with a glass tank, and means for drawing a sheet continuously therefrom, of a draw-bar of refractory material extending transversely of the tank and submerged below the surface of the glass, an electrode at each side of the draw-bar adjacent the surface of the glass, and means for causing a flow of electric current through the layer of glass above the bar from one electrode to the other.

12. The combination with a glass tank, and means for drawing a sheet continuously therefrom, of a draw-bar of refractory material extending transversely of the tank and submerged below the surface of the glass, electrodes of molten metal in opposition to each other adjacent the level of the glass bath, and means for causing a current of electricity to flow therebetween through the layer of glass lying above the draw-bar.

13. The combination with a glass tank, and means for drawing a sheet continuously therefrom, of a draw-bar of refractory material extending transversely of the tank and submerged below the surface of the glass, electrodes of molten metal on opposite sides of the draw-bar in contact with the upper portion of the molten glass, and means for causing a current of electricity to flow therebetween through the layer of glass lying above the draw-bar.

14. The combination with a glass tank, and means for drawing a sheet continuously therefrom, of a draw-bar of refractory material extending transversely of the tank and submerged below the surface of the glass, electrodes of molten metal on opposite sides of the draw-bar in contact with the upper portion of the molten glass and extending longitudinally of the draw-bar, and means for passing a current of electricity through the layer of glass lying above such bar.

15. The combination with a glass tank, and means for drawing a sheet continuously therefrom, of a draw-bar of refractory material extending transversely of the tank and submerged below the surface of the glass, clay members also extending transversely of the tank on each side of the draw-bar, each provided on its side toward the draw-bar and at the level of the bath with a longitudinal trough or pocket, electrodes in the form of molten metal lying in said troughs in contact with the molten glass, and means for passing a current of electricity between the electrodes and through the layer of glass above the draw-bar.

16. The combination with a glass tank, and means for drawing a sheet continuously therefrom, clay members extending transversely of the tank on opposite sides of the line of draw of the sheet and each provided on its side toward the draw-bar and at the level of the bath with a longitudinal trough or pocket, electrodes in the form of molten metal lying in said troughs in contact with the molten glass, and means for passing a current of electricity between the electrodes and through the surface layer of glass from which the sheet is drawn.

JOHN H. FOX.
HARRY F. HITNER.